May 11, 1954  G. L. BADER ET AL  2,678,030
DUAL FUEL CONSTANT SPEED CONTROL
Filed Feb. 21, 1949  4 Sheets-Sheet 1

Inventors
Gerald L. Bader
George J. Wohanka
by Parker & Carter
Attorneys.

Inventors
Gerald L. Bader
George J. Wohanka
by Parker & Carter
Attorneys

Patented May 11, 1954

2,678,030

UNITED STATES PATENT OFFICE 2,678,030

DUAL FUEL CONSTANT SPEED CONTROL

Gerald L. Bader and George J. Wohanka, St. Louis, Mo., assignors to Nordberg Manufacturing Company, Milwaukee, Wis., a corporation of Wisconsin Application February 21, 1949, Serial No. 77,496

9 Claims. (Cl. 123—27)

Our invention relates to a dual fuel constant speed control system, method and apparatus for compression ignition engines. One object of our invention is to provide a method and apparatus whereby dual fuel engines, that is engines which may run either on gas or on liquid fuel or both, may be automatically controlled by a governor irrespective of the fuel being used.

Another object of our invention is to provide a control arrangement where the entire range of governor movement may be made use of to control both gas operation and oil operation.

We provide an engine wherein there will be a gas supply and an oil supply, and the operation of the gas supply and the operation of the oil supply will be controlled in consonance by the governor. In the preferred arrangement, the parts are so adjusted that when oil alone is to be used, no gas is fed to the governor controlled gas valves. When gas is to be burned, gas will be supplied to the governor controlled valves and the oil supply will no longer be controlled by the governor, but will be set for an irreducible minimum, such that sufficient pilot oil only may reach the engine, to assist in igniting the gas, it being understood that under normal conditions the gas-air mixture does not lend itself to reliable compression ignition and so a pilot oil supply must be fed to act, so to speak, as a spark plug in igniting the gas.

It may happen that the gas supply fails and means are provided whereby the control arrangement will be automatically reversed, the governor resuming control of the oil valves to take over control of the oil supply and to govern the engine through the control of oil alone.

If the gas supply should be resumed and it should be added to the engine without some change in the oil control, difficulty would result, so we provide an automatic lock-out for the gas supply which must be manually released after the gas supply has failed before gas can again be furnished to the engine.

It is important that when the governor does control the oil or when it does control the gas, it controls it throughout the entire range of governor position as distinguished from the situation where reliance has been placed on speed droop so that the governor controls oil through-out part of its range and gas throughout another part of its range. It is this arrangement that makes it possible to step over from oil to gas or from gas to oil without any change in engine speed or load carrying characteristics because whether the governor is controlling the gas supply or the oil supply, the governor member is in the same position.

We provide an automatic means whereby when the gas supply has failed, gas cannot be supplied again unless a safety device has been manipulated. This prevents the danger of gas being supplied while maximum oil is being supplied which would overcharge the engine. That is the reason why we provide, in connection with the manual control to shift over from oil to gas, a lock-out device which, when the lever is moved to operate the engine on gas with the governor controlling gas but not controlling oil, the oil supply mechanism locks. Failure of the gas supply, which results in the engine going back to oil operation, also closes the safety member so that gas cannot again be supplied until the operator has intervened.

Our invention is diagrammatically illustrated in the accompanying drawing which shows only enough of the engine to illustrate the relationship between it and the elements of the control mechanism which embody our invention, and only so much of the detail of those control elements is illustrated as form a part of the invention.

Figure 1:
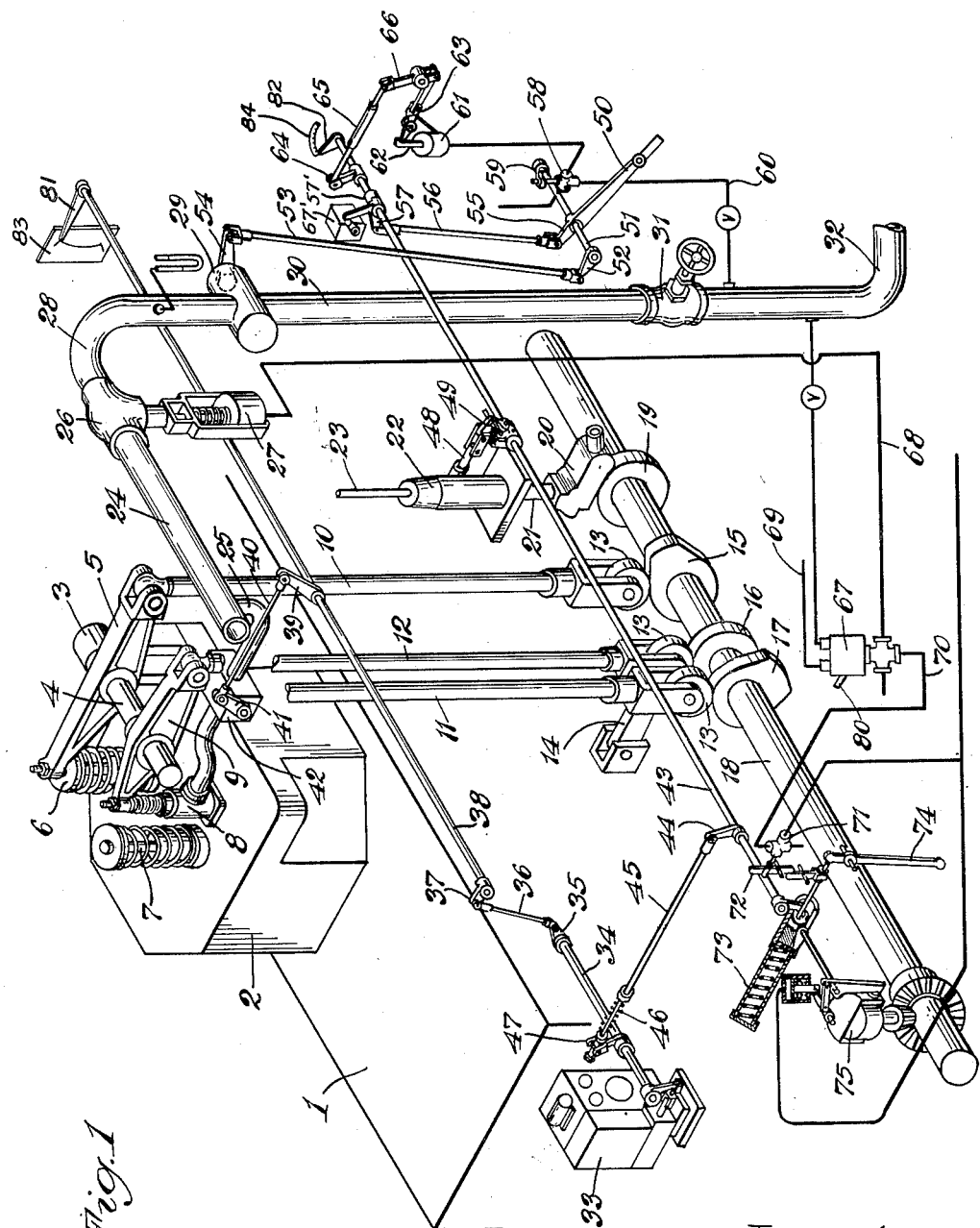
Figure 1 is an isometric view of the engine.
Figure 3:
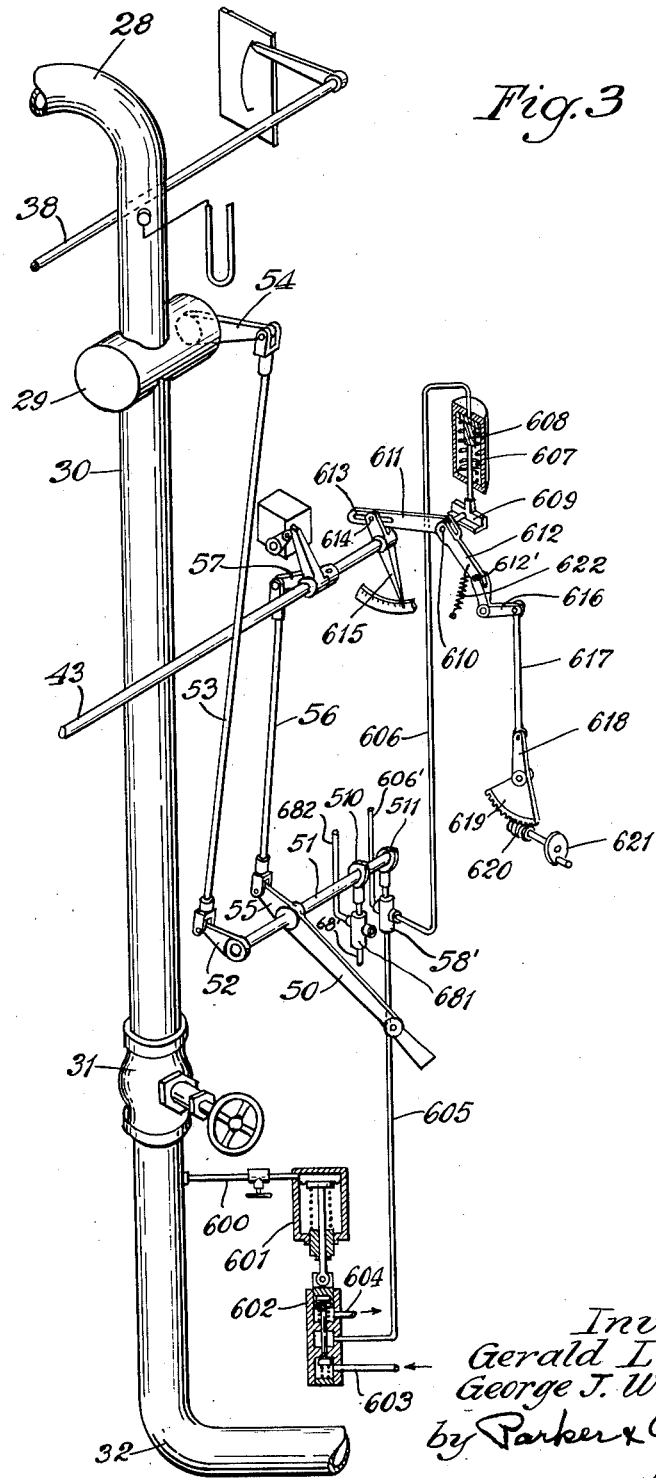
Figure 3 is an isometric drawing of a modified form of part of the engine control.
Figure 4:
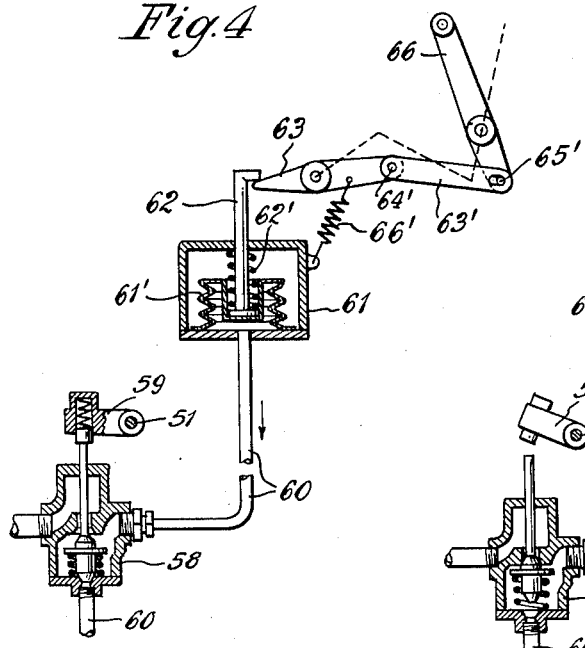
Figure 5:
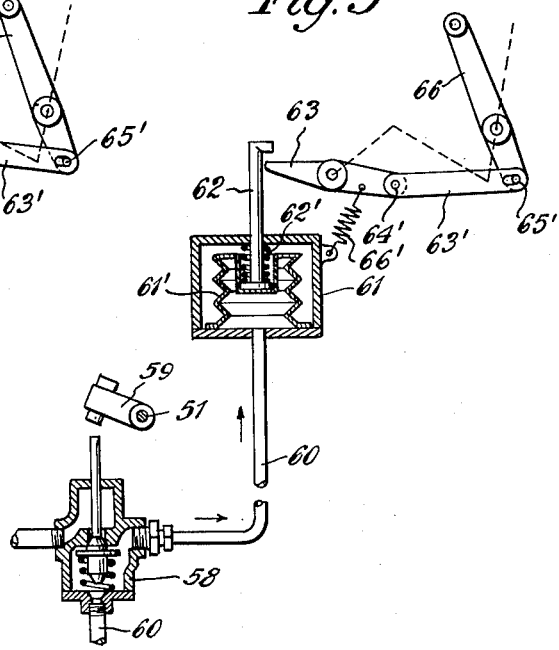
Figure 6:
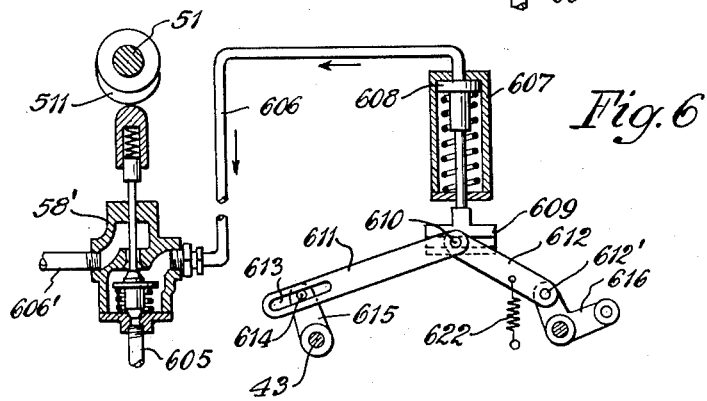
Figure 7:
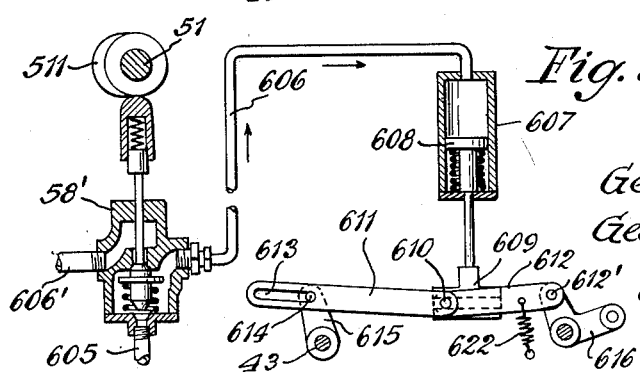

Figures 4 and 5 are side views on an enlarged scale of the linkage mechanism in Figure 1, the mechanism being shown in the latched position in Figure 4 and in the latched position in Figure 5; and Figures 6 and 7 are side views on an enlarged scale of the linkage mechanism shown in Figure 3, Figure 6 being the unlatched position of the linkage mechanism and Figure 7 being the latched position of the linkage mechanism.

I is the engine cylinder block having a cylinder head 2 on which is a bracket 3 supporting a rock shaft 4. 5 is a rock arm on the rock shaft 4 operating an engine exhaust valve 6. 7 is the engine intake valve, its rock arm 5 being omitted from the drawing in the interest of clarity. 8 is the gas inlet valve and 9 a rock arm therefor. 10, 11 and 12 are push rods actuating respectively the rock arms 5 and 9 and the omitted push rod for the valve 7, to open and close the exhaust valve, the gas inlet valve and the air inlet valve. Each of the push rods 10, 12 and 11 has a cam roller, is guided by a link 14, and is in working relationship respectively with exhaust cam 15, gas cam 16 and air cam 17 on the cam shaft 18.

Cam shaft 18 is driven in any suitable conventional manner from the engine crank shaft. 19 is the fuel oil injection cam, 20 a cam follower in engagement with the cam 19, having any suitable adjustment means as indicated, and adapted through a plunger 21 to actuate the fuel oil injection pump 22, receiving oil from any suitable source not here shown and discharging oil under pressure through the pipe 23 to any suitable injection nozzle in the engine cylinder head.

The details of exhaust passages and scavenging air manifold associated with the cylinder head are omitted from the drawing in the interest of clarity. The gas manifold 24 is connected to the cylinder head by a conduit 25 and is provided with a safety valve 26 actuated by a safety plunger 27. Gas under pressure reaches the manifold 24 through pipe 28 controlled by the gas shut-off valve 29 which in turn receives gas through the pipe 30 controlled by the manual gas control valve 31, such gas coming from any suitable source, not here illustrated, through the supply line 32.

33 is an engine governor driven by any suitable means from the engine. It actuates a governor rock shaft 34 which by lever 35, link 36 and lever 37 rocks the gas control shaft 38. Lever 39, link 40 and lever 41 connect the gas control shaft 38 and the gas regulating or governor valve 42 so that rocking of the governor shaft 34 in consonance with a change in engine conditions actuates the gas-regulating valve 42 to control the amount of gas fed to the engine. The gas regulating valve 42 may be set to give quality control by which its effective opening may be changed to compensate for variations in the characteristics of the gas supply and to maintain full governor travel regardless of gas quality, thus giving both quantitative and qualitative control.

43 is the oil control shaft connected by lever 44, link 45, spring 46 and lever 47 with the governor shaft 34. Angular movement of shaft 34 will rock the oil control shaft 43, the spring 46 being of such strength that it normally acts as a rigid member to transmit governor action to the oil control shaft. 48 is a pump control rack connected by lever 49 to the shaft 43 so that governor movement rocking the shaft 43 moves the rack 48 back and forth to change the output of the pump 22 in consonance with the governor position.

50 is the control lever. It is fixed on the shaft 51. This shaft carries the lever 52 connected by link 53 and the lever 54 with the gas shut-off valve 29. Lever 55, link 56 and lever 57, the latter on the oil control shaft 43, cause rotation of the shaft 43 through a one-way coupling 57' when the lever 50 is moved. Rotation of lever 50 from the position shown in the drawing in a clockwise direction, opens the gas shut-off valve 29.

58 is a locking gas valve actuated by a lever 59 on the shaft 51. A gas line 60 leads from the supply pipe 32 below the manual gas control valve 31 through the locking gas valve 58 to the gas pressure cylinder 61 which actuates a hook 62 associated with a spring controlled pilot fuel latch 63. The lever 59, when rotated in a clockwise direction, referring to the position of the lever in Figure 2, rotates the oil control shaft 43. The shaft 43, through the lever 64, link 65, and lever 66, sets the toggle pilot fuel latch member 63 in the position in which it is shown in Figure 1. The setting of this latch locks the oil control shaft 43 in the pilot fuel position independent of governor control, under which circumstance the governor operates against the spring 46 and is still able to operate the gas valve control. In Figure 4, the latch mechanism is shown with the gas pressure in the line 60 being vented. In Figure 5, gas pressure is being supplied to the cylinder 61 through the gas line 60. In Figure 4, the shaft 51 has been rotated counterclockwise by the lever 50 and the valve plunger has been urged against its seat in the lower part of the locking gas valve 58. Thus, the pressure in the part of the gas line 60 between the cylinder 61 and the valve 58 is vented. When the lever 59 is raised, as shown in Figure 5, the spring in the gas locking valve 58 raises the valve and the portion of the line 60 between the gas supply pipe 32 and the locking gas valve 58 is placed in communication with the gas pressure cylinder 61.

The gas pressure cylinder has a bellows 61' which carries the hook 62. The shank of the hook and the bellows are biased downwardly by a conventional coil spring 62'. The pilot fuel latch 63 is pivotally positioned so that one end resides under the hook 62 and the other end is pivoted at 64' to a link 63'. The right-hand end of the link is pivoted at 65' to a lever 66. A spring 66' biases the latch 63 clockwise.

When the hook is raised by the pressure of the gas in the bellows 61', as shown in Figure 5, the spring 66' will bias the hook to the position of Figure 5. The pivot 64' between the latch 63 and the link 63' passes below the line between the pivot of the latch 63 and the pivot 65' between the lever 66 and the link 63'. Clockwise movement of the lever 66 causes the latch 63 to rotate clockwise, but the latch 63 is prevented from any clockwise movement by the hook 62.

When the gas pressure fails in the supply pipe 32 or the locking valve 58 is vented, the bellows 61' collapses and the hook 62 is forced down by the spring 62' into the position of Figure 4. The hook 62, while moving downwardly, rotates the latch 63 counterclockwise and the pivot 64' moves above the center lines. When the shaft 43 is rotated by the governor 33, the lever 66 again moves clockwise, but, in this position, the latch 63 rotates counterclockwise and its movement is not impeded by the hook 62.

The essence of this mechanism is the position of the hook 62. If it is raised as in Figure 5, the spring 66' pulls the pivot 64' between the latch 63 and the links 63' below the center lines. If the hook is in its lower position as in Figure 4, it rotates the latch 63 counterclockwise until the pivot 64' is above the center lines.

A conventional alarm mechanism 67' is shown in Figure 1. This alarm can be actuated by a lever nonrotatably mounted on the shaft 43. The specific alarm mechanism forms no part of the present invention and it will not be alluded to in detail.

67 is a safety control valve assembly joined by the conduit 68 to the safety plunger 27, by conduit 69 to the fuel oil pressure system and by conduit 70 to the valve 71, which valve is controlled by the lever 72, a governor speed cut-out mechanism 73, reset lever 74 and overspeed governor cut-out 75.

In operation, the engine will normally be started as a full diesel engine operating on fuel oil. This is accomplished by moving the control lever 50 clockwise into an intermediate position between stop and run-oil positions (see Figure 2), holding it there and then by any suitable means such as the manipulation of a main starting air valve, causing the engine to turn over. When the engine begins to pick up speed, the control lever 50 may then be moved further clockwise into the run-oil position. The reason for not moving it all the way to the run-oil position at first is to limit the action of pump 22 to prevent the cylinders from receiving full charges of fuel oil during the low speed starting period as this might cause excessive cylinder pressures and interfere with starting.

If the lever 50 is left at run-oil position, with valve 31 closed, the engine will run on oil, will not receive any gas, and the governor will control the fuel pump to control engine operation.

Figure 2:
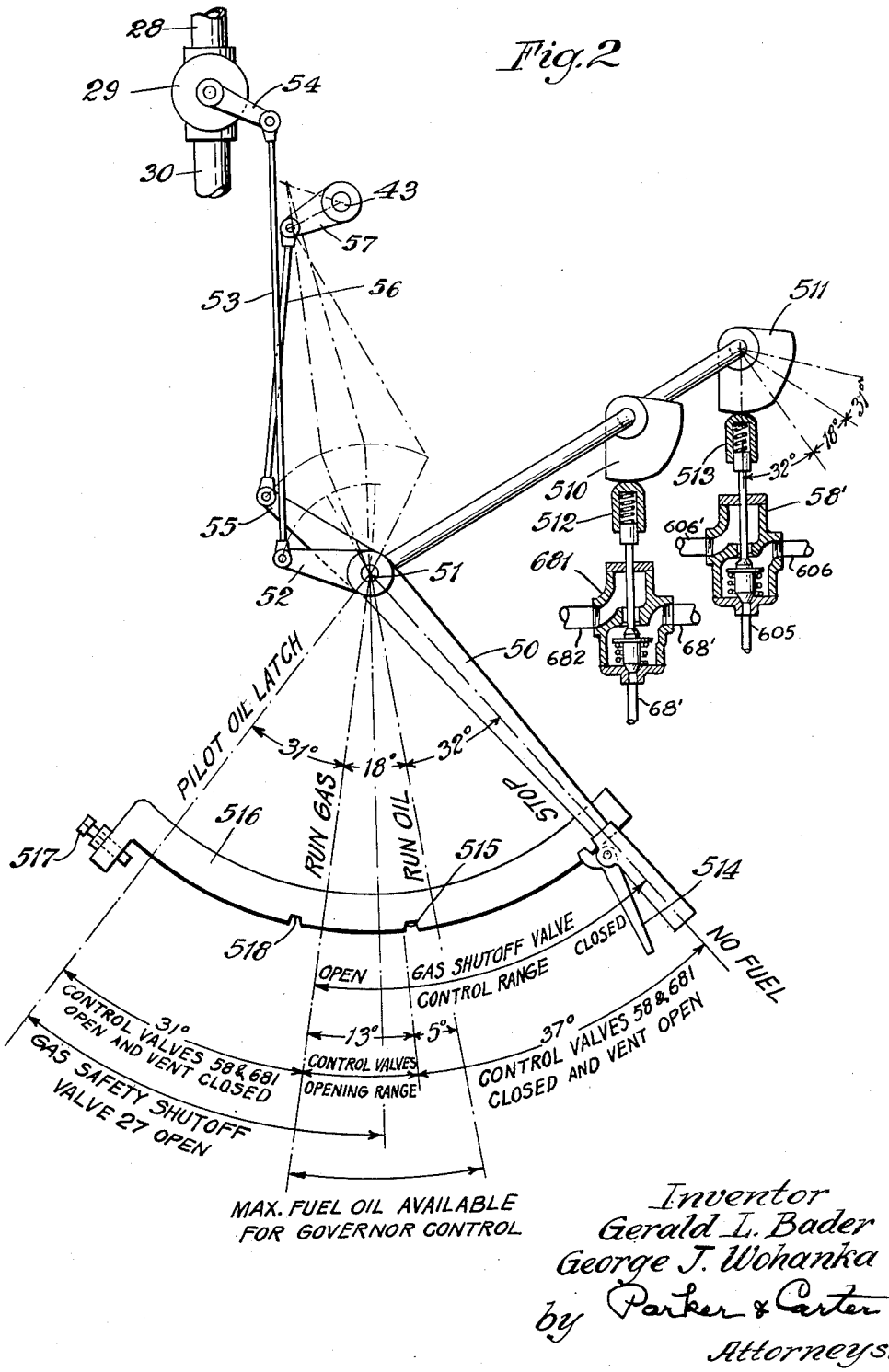
Figure 2 is a control lever sequence diagram.

If the operator wishes to shift over to gas operation, he will open the manual valve 31. This allows gas pressure from the pipe 32 to reach the valve 29 when lever 50 is moved to run-gas position. He then rotates the lever 50 to the pilot oil latch position, its furthest position away from the starting position (Figure 2). This will open the gas shut-off valve 29 and allow gas to reach the governor control gas valve 42. It will also rotate the oil control shaft 43 to set the latch 63 in engagement with the hook 62 on the gas cylinder 61 as above pointed out. This is possible because the movement of the lever 50 has opened the valve 58 to permit gas under pressure to reach the cylinder 61. The operator will then return the lever 50 to the run-gas position, leaving the oil control shaft 43 locked against movement. The lever 50 is moved beyond the run-gas position over to the stop 517 in order that there can be no chance because of clearances, lost motion or the like, that the oil control fails to be locked out. After the oil control latch has engaged, the lever is then returned to the run-gas position, the latch 514 engaging the notch 518 so that the lever itself is locked in position where it remains until the operator deliberately releases it. Under these circumstances, the oil control is locked out until gas pressure drops to unlatch the oil control lock out or until the lever 50 is again manipulated. Movement of the governor shaft 34 may continue, the spring 46 flexing, but the shaft 43 would be locked into the position at which the pump 22 furnishes just enough pilot oil to inaugurate combustion of the gas.

For full gas operation, the manually adjusted valve 31 would normally be wide open. If it is desired to operate partially on gas and partially on oil, the valve would be closed down partially and the lever 50 would be moved into the run-gas position after having been moved to the run-oil position to release the latch 63 and permit the governor to control the injection pump output.

If gas pressure should fail, pressure in cylinder 61 will drop, the latch 63 will release, the governor will resume control of the oil and the engine will run on oil. This gas failure will cause the safety valve 26 to be closed and no gas can reach the engine even though thereafter gas pressure goes on. It would do the operator no good to manipulate the lever 50 under these circumstances. He must first release the valve 67 by manipulating the short reset lever 80.

Release of the latch 63 restores the situation to oil operation only because as soon as the shaft 43 is free to rotate, being no longer locked against movement, the governor resumes control of and rotation of the oil shaft 43. Thus failure of gas pressure does three things. It causes the gas valve 26 to close; it trips the latch 63 to permit the governor to control the oil; and it causes the engine to again operate on oil without gas. There is thus provided an automatic return feature and it makes no difference what happens with respect to the gas supply. From then on, unless the lever 80 is tripped to permit resumption of gas operation, the engine never operates on pilot oil only. The sole purpose of pilot oil is to ignite the gas. In a sense, the supply of pilot oil is a substitute for the spark ignition in an Otto cycle engine. When gas is not fed to the engine, the engine will stop unless more than pilot oil is supplied. That is what makes it necessary to automatically unlatch the pilot oil control so that when gas supply fails the engine returns to oil operation.

There are circumstances where it becomes important to have an automatic return to oil from the intermediate position. While under ordinary conditions you either run on oil or on gas with pilot oil, it does happen that the engine may be set to run on some larger percent of oil. This is especially important in connection with work in cold climates where the gas supply may be reduced on occasion and it becomes necessary to boost the engine by the use of oil but it is not necessary to use the entire amount of oil. Under these circumstances, it also happens that there may be a sudden drop in the gas supply. We have illustrated above a mechanism by which, when the engine is running on gas entirely with pilot oil and the gas supply goes off, the engine automatically goes back to oil. We now call attention to a further refinement by virtue of which, when the engine is set to run on part oil and part gas, something more than pilot oil, the engine will still return to oil operation if the gas supply is discontinued.

Referring now especially to Figure 2, the shaft 51 carries any suitable valve actuating means, such as the cam 511 which engages valve piston 513 in valve 58' so that movement of the control lever 50 will actuate this valve as well as the gas shut-off valve 29 and the fuel control shaft 43. Now if the lever 50 is moved to the left, the finger latch 514 can engage the notch 515 in the quadrant 516. Under these circumstances, the engine runs on oil in the usual way, no gas being present, the gas valve 29 being not yet opened and the valve 58' being also not yet opened.

In the modification of Figure 2, the shaft 51 controls the valve 58', as well as a valve 681. A cam 510 is mounted on the shaft 51 and engages a follower 512, the follower actuating a valve piston in the valve 681. The valve 681 is positioned in the line 68' between the safety control valve assembly 67 and the safety plunger 27, so that the safety plunger will be inactivated in certain positions of the hand lever 50.

It should be understood that the valve 681 in the line 68' is not absolutely necessary as the Figure 2 species could have a line leading directly from the safety control valve assembly to the safety plunger 27. However, the arrangement in Figure 2 is quite satisfactory.

The valve 681 is provided with a vent 682, so that the line 68' between the safety plunger 27 and the valve 681 may be vented under actuation of the manual lever 50.

If the operator wishes now to run on gas with pilot oil, he releases the finger latch 514, moves the control lever 50 in a clockwise direction to the lever stop 517 which rotates the fuel control shaft 43 into the latching position and opens the gas shut-off valve 29. He then moves the lever back until the finger latch 514 engages the notch 518 on the quadrant 516 and the engine runs on gas with pilot oil. If the gas supply fails, the latch will be released and the engine will resume operation on oil.

This however is limited, as previously pointed out, to a situation where the engine is set to run on only a minimum quantity of pilot oil. In the device shown in Figure 3, the pipe 600 leads from the gas supply pipe 32 on the upstream side of the valve 31 to a gas diaphragm cylinder 601 which actuates a control valve 602. Air comes to the valve under pressure through the duct 603 and may be either vented at 604 or supplied to the conduit 605 leading to the valve 58' controlled by the shaft 51, as the case may be. The conduit 606 leads from the valve 58' to the air cylinder 607 which contains a piston 608 carrying a crosshead 609. When air pressure thus reaches cylinder 607, piston 608 is held down so that the toggle latch 610 remains in locked position. Failure of gas pressure in pipe 32 with resultant shutting off of air through valve 602, 58 to cylinder 607 permits the spring in cylinder 607 to release the toggle latch. The pin 610 of a toggle latch comprising the links 611, 612 is carried by the crosshead 609. The link 611 is slotted at 613 to engage the pin 614 on the lever 615 on the fuel shaft 43. The bell crank lever 616 has one arm pivoted to the end of the link 612, the other arm is engaged by a connecting rod 617 which leads to the lever 618 on a quadrant 619 engaged by the worm 620 adapted to be set by the handwheel 621, the spring 622 tending to hold the toggle in the latched position. In Figure 3 the toggle is shown in the unlatched position.

In Figures 5 and 6, we have shown both the latched and unlatched positions of the latch mechanism for the species of Figures 2 and 3. The valve 58' is controlled by the cam 511 on the shaft 51. In Figure 6, the cam has forced the valve plunger down so that line 605 is shut off and line 606 is placed in communication with a vent 606'. The piston 608 in the cylinder 607 rises under the impetus of its spring and the cross head 609 carries the pin 610 upward above the center line between the pin 614 and the pivot 612'. The pin 610 rides on the ledge of the crosshead 609 as shown in Figure 3, and can move upwardly but not downwardly. In the position of Figure 6, clockwise rotation of the shaft 43 moves the pin 614 to the right end of the slot 613, and the links 611 and 612 jack-knife upwardly because the pin 610 can move upwardly. The shaft 43, therefore, is unlatched and can rotate in both directions. In Figure 7, the cam 511 on the shaft 51 is not holding the valve plunger down, and the spring in the valve 58' has raised the plunger. The high pressure air in line 605 communicates with line 606 and forces the piston 608 down. The crosshead moves down and the pin 610 moves below the center line between the pin 614 and the pivot 612'. Clockwise rotation of the shaft 43 in this position tends to jack-knife the links 611 and 612 downwardly, but the crosshead prevents downward movement of the pin 610. Therefore, the shaft 43 is prevented from clockwise rotation.

When the operator wishes to set the engine to run on more than the minimum pilot oil, he rotates the handwheel 621 to set for any desired proportion of oil and gas, and the engine then runs with that proportion. The governor now does not control the oil, the amount of oil being set by hand by the operator. Governor variation will, of course, change the proportion of oil and gas by varying only the amount of gas but, if and when the gas supply is discontinued, the latching out of the governor control of oil will be automatically discontinued and the engine will then resume operation on oil.

It will be realized that whereas we have described and illustrated a practical and operative device, nevertheless, many changes may be made in the size, shape, arrangement, number and disposition of parts without departing materially from the spirit of our invention. We wish, therefore, that our showing be taken as in a large sense illustrative or diagrammatic, rather than as limiting us to our precise showing.

The use and operation of our invention are as follows:

All the various safety members or devices are checked and locked in proper position. The control lever 50 is then moved in a clockwise direction into the intermediate position between stop and run-oil. The engine is then rotated. As the engine picks up speed, the control lever 50 is moved to the run-oil position. The starting means, preferably the starting air valve, is closed and the engine runs under governor control, the fuel control shaft actuated by the governor being free to take any position between minimum and maximum fuel positions, depending on the load. This gives full governor range and full governor operation. The point is that under these circumstances the engine is operated under the control of the governor in the usual way, the important thing being that the governor throughout its entire range of movement is free to exert its control on the amount of oil injected into the engine.

If now it is desired to change from oil to gas at full load or at any intermediate load, the control lever 50 is in the run-oil position, the safety control valve assembly 67 is closed, the manual gas control valve 31 is opened wide and the control lever 50 is moved in a clockwise direction to the limit of its excursion, that is, to the pilot oil latch position. This latches the oil control shaft in the pilot position so that the minimum amount of oil is fed to the engine, the governor having no control of the oil and there being no change in oil supply from time to time or under variations of load. Having moved the control lever 50 to pilot oil latch position, it is then moved back to the run-gas position.

During the interval from the opening of the manual gas control valve 31 and before the control lever 50 reaches pilot oil latch position, gas is supplied to the engine and that means that less oil needs to be burned to carry the load. The governor compensates for this by cutting down on the amount of fuel oil and by moving the gas valve 42 in consonance therewith so that for that short interval of time the engine is running on gas and oil.

This situation changes as soon as the control lever 50 has been moved to the pilot oil latch position because then the governor oil control is locked out and the governor controls gas only throughout its entire range of governor movement. Under these circumstances, of course, full speed droop and full governor operation of the engine on gas is just as convenient and just as possible as when the engine runs on oil.

In the run-gas position of the lever 50 the control valve 58 is held open, thus allowing gas pressure to act on the cylinder 61 and permit the pilot fuel latch 63 to hold the control shaft in pilot fuel position.

If gas pressure fails, pressure will drop in the cylinder 61, the latch 63 is released, the fuel control shaft is released and free to move to increase oil fuel position under control of the governor. If gas pressure is suddenly restored, the control valve 67 prevents the supply of gas until the safety lever 80 is reset.

When the engine is to be stopped while running on gas, the control lever is moved to the run-oil position, the manual gas control valve 31 is closed, the engine runs a few minutes on oil to clear from gas, after which the lever 50 is moved to the stop position.

Pointers 81, 82 moving over dials 83, 84 on shafts 38, 43 enable the operator, while making adjustments, to visually determine the position in the cycle of governor movement occupied by the gas control shaft and the fuel oil control shaft.

We claim:

1. In an internal combustion engine of the pressure ignition type adapted to burn both fuel oil and fuel gas, the engine having a cylinder, a piston movably mounted in the cylinder, a governor, a fuel oil supply for the cylinder, a fuel gas supply for the cylinder, control means actuated by the governor for varying the amount of fuel oil and the amount of fuel gas supplied to the cylinder, a manual control, independent of the governor, for varying the amount of fuel gas supplied to the cylinder, a connection between the manual control and the governor-actuated control, a locking mechanism adapted to lock the governor-actuated fuel oil control means out of governor control when the manual fuel gas control has been moved to the maximum fuel gas supply position, and a releasing means responsive to a failure of the fuel gas supply for releasing the fuel oil control connection to cause resumption of the fuel oil control by the governor.

2. In an internal combustion engine of the pressure ignition type adapted to burn both fuel oil and fuel gas, the engine having a cylinder, a piston movably mounted in the cylinder, a governor, a fuel oil supply for the cylinder, a fuel gas supply for the cylinder, control means actuated by the governor for varying the amount of fuel oil and the amount of fuel gas supplied to the cylinder, a locking mechanism adapted to lock the governor-actuated oil control means out of governor control at a predetermined amount of gas supply, and lock releasing means responsive to a failure of the gas supply for releasing the locking means to cause a resumption of the oil control by the governor.

3. In an internal combustion engine of the pressure ignition type adapted to burn both fuel oil and fuel gas, the engine including a cylinder, a piston movably mounted in the cylinder, a governor, a fuel oil supply for the cylinder, a fuel gas supply for the cylinder, control means actuated by the governor for varying the amount of fuel oil and the amount of fuel gas supplied to the cylinder, a manual control, independent of the governor, for varying the amount of fuel gas supplied to the cylinder, a connection between the manual control and the governor control, a locking mechanism adapted to lock the fuel oil control means out of governor control when the manual fuel gas control means has been moved to the maximum fuel gas supply position, lock releasing means responsive to a failure of the fuel gas supply for unlocking the locking mechanism to cause a resumption of the fuel oil control by the governor, and means, independent of both the governor and the manual control, responsive to a failure of the fuel gas supply to the cylinder to prevent a subsequent supply of fuel gas to the cylinder.

4. In an internal combustion engine of the pressure ignition type adapted to burn both fuel oil and fuel gas, the engine including a cylinder, a piston movably mounted in the cylinder, a governor, a fuel oil supply for the cylinder, a fuel gas supply for the cylinder, control means actuated by the governor for varying the amount of fuel oil and the amount of fuel gas supplied to the cylinder, a locking mechanism adapted to lock the fuel oil control means out of governor control at a predetermined gas supply, lock releasing means responsive to a failure of the fuel gas supply for unlocking the locking mechanism to cause a resumption of fuel oil control by the governor, and means, independent of the governor, responsive to a failure of the fuel gas supply to the engine to prevent a subsequent supply of fuel gas to the engine.

5. In an internal combustion engine of the pressure ignition type, adapted to burn both fuel oil and fuel gas, the engine including a cylinder, a piston movably mounted in the cylinder, a governor, a fuel oil supply for the cylinder, a fuel gas supply for the cylinder, control means actuated by the governor for varying the amount of fuel oil and the amount of fuel gas supplied to the cylinder, a manual control, independent of the governor, for varying the amount of fuel gas supplied to the cylinder, a connection between the manual control and the governor control, and a locking mechanism to lock the governor-actuated fuel oil control means out of governor control when the manual fuel gas control has been moved to the maximum fuel gas supply position, and to limit the amount of fuel oil supply to a minimum unregulated pilot supply.

6. In an internal combustion engine of the pressure ignition type, the engine including a cylinder, a piston movably mounted in the cylinder, a fuel oil supply adapted to supply fuel oil to the cylinder, a fuel gas supply adapted to supply fuel gas to the cylinder, a governor, separate control means actuated by the governor for controlling the fuel oil supply and the fuel gas supply, a movable manual control adapted in one position to control the fuel oil control means for governor-controlled operation, in another position to condition the fuel gas control means for governor-controlled operation, and in another position to condition the fuel oil control means for a constant supply of pilot fuel oil independent of governor control, means responsive to a failure of the fuel gas supply for returning the fuel oil supply to governor control, and a locking mechanism responsive to a failure of the fuel gas supply for preventing the supply of fuel gas to the engine.

7. In an internal combustion engine of the pressure ignition type, including a cylinder, a piston movably mounted in the cylinder, a gas supply line leading to the cylinder, a gas control valve in the line, a fuel oil pump and a connection between it and the cylinder, means for actuating the pump to supply fuel oil to the cylinder, a control means therefor, a governor and an operating connection between it and the gas control valve and between the governor and the pump control means, so that the gas control valve and the pump control means are adapted for control by the governor, a manually controlled gas valve in the gas supply line, a manual control member and a connection between it and the manual controlled valve, a connection between the manual control member and the pump control means, a locking means operated by the manual control member to lock the pump control means against governor-controlled operation, said locking means including a latch member responsive to the gas pressure in the gas supply line, so that the failure of the gas pressure releases the locking means independent of the position of the manual control member, and means associated with the gas supply line for automatically closing the line between the manually controlled valve and the gas controlled valve whenever pressure in the gas supply line is lost, so that gas cannot enter the cylinder when pressure is resumed in the gas supply line after it has failed.

8. In an internal combustion engine of the pressure ignition type adapted to burn both fuel oil and gas, the engine including a cylinder, a piston movably mounted in the cylinder, a governor, means controlled by the governor for separately varying the amount of gas and the amount of oil supply to the engine, a valve in the gas supply adapted to vary the amount of gas supplied to the engine, a manual control means for the valve, a connection between the manual control means and the governor-controlled oil supply means adapted, when the gas valve is opened, to prevent governor control of the oil, latching means adapted to separately hold the governor control means out of control of the oil supply means, and means responsive to excessive reduction in pressure of the gas supply to release the latching means.

9. In an internal combustion engine of the compression ignition type adapted to burn both fuel oil and fuel gas, the engine having a cylinder, a piston movably mounted in the cylinder, a governor, an oil supply for the cylinder, a gas supply for the cylinder, oil control means actuated by the governor for varying the amount of oil supplied to the cylinder, gas control means actuated by the governor for varying the amount of gas supplied to the cylinder, a manual control independent of the governor for varying the amount of gas supplied to the cylinder, a connection between the gas control and the governor actuated control means, a mechanism to render the oil control means ineffective and out of governor control when the manual control has been moved to the maximum gas supply position, and means responsive to a substantial reduction of the fuel gas supply for returning the oil control means to governor control.

References Cited in the file of this patent

UNITED STATES PATENTS

| Number | Name | Date |
|---|---|---|
| 1,833,265 | Schmidt | Nov. 24, 1931 |
| 1,858,824 | Heidelberg | May 17, 1932 |
| 2,400,219 | Barnaby et al. | May 14, 1946 |
| 2,400,247 | Miller et al. | May 14, 1946 |
| 2,489,405 | Doyle | Nov. 29, 1949 |

FOREIGN PATENTS

| Number | Country | Date |
|---|---|---|
| 537,024 | Great Britain | June 5, 1941 |